No. 741,900. PATENTED OCT. 20, 1903.
S. W. FINCH.
BANK CHECK OR THE LIKE.
APPLICATION FILED SEPT. 13, 1902.
NO MODEL. 2 SHEETS—SHEET 1.

Witnesses:
D. E. Burdine
Fannie Weie

Inventor:
Stanley W. Finch,
by Dodge and Sons
Attorneys

No. 741,900. PATENTED OCT. 20, 1903.
S. W. FINCH.
BANK CHECK OR THE LIKE.
APPLICATION FILED SEPT. 13, 1902.
NO MODEL. 2 SHEETS—SHEET 2.
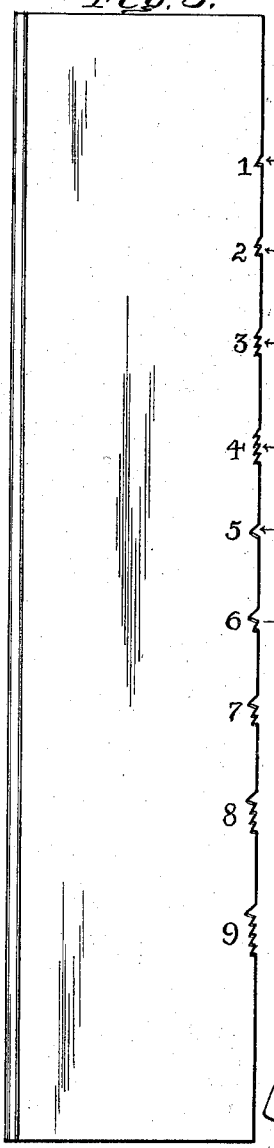
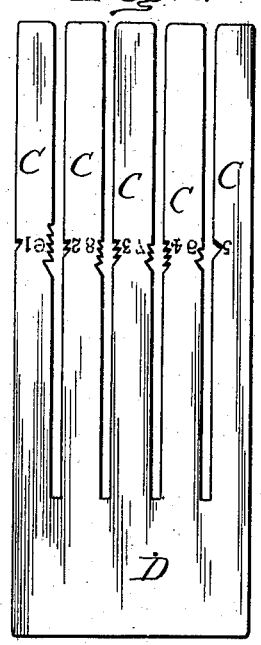
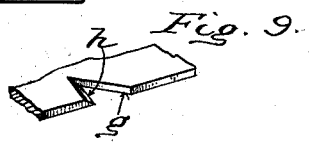
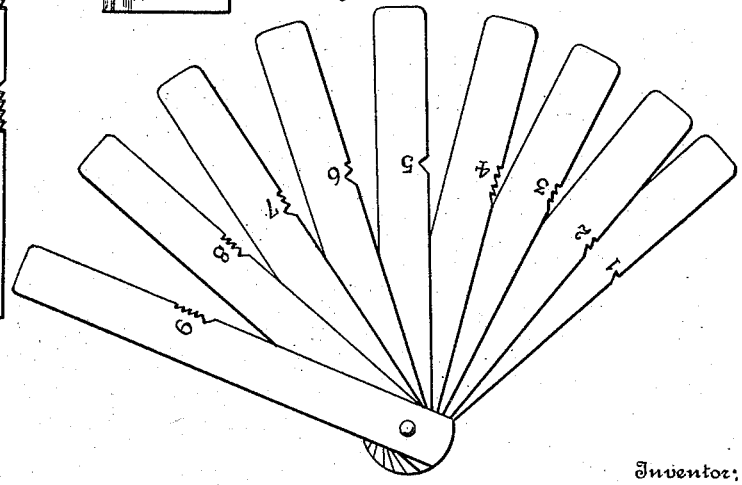
Witnesses
D. E. Burdine
Fannie Wise
Inventor:
Stanley W. Finch,
by Dodge and Sons
Attorneys No. 741,900. Patented October 20, 1903.

UNITED STATES PATENT OFFICE.

STANLEY W. FINCH, OF WASHINGTON, DISTRICT OF COLUMBIA.

BANK-CHECK OR THE LIKE.

SPECIFICATION forming part of Letters Patent No. 741,900, dated October 20, 1903.

Application filed September 13, 1902. Serial No. 123,348. (No model.)

*To all whom it may concern:*

Be it known that I, STANLEY W. FINCH, a citizen of the United States, residing at Washington, in the District of Columbia, have invented certain new and useful Improvements in Bank-Checks or the Like, of which the following is a specification.

My present invention pertains to bank-checks or the like, the construction and arrangement of which will be hereinafter set forth, reference being had to the annexed drawings, wherein—

Figure 1 is a face view of a blank check with its attached stub; Figs. 2, 3, and 4, similar views showing the checks drawn for different amounts, the stubs being separated therefrom and each check formed with a protective projection or projections indicative of the amount for which the check is drawn; Figs. 5 to 8, inclusive, views showing various forms of rules by which the check may be protected; and Fig. 9, a perspective view of a portion of a rule, showing the cutting or tearing edges in detail.

The object of my invention is to protect a check in such manner that it cannot be raised to a greater amount than that for which it was originally drawn. Heretofore many methods have been proposed for accomplishing this end; but so far as I am aware none have been universally successful and have necessitated more or less alteration in the body of the check or the imprinting of certain matter thereon.

Under my method a projection or series of projections of arbitrary shape are formed on the check, preferably in the act of severing the check from its stub, which projection or projections denote or show absolutely the amount for which the check is drawn. Furthermore, the projections are so formed that any alteration in their shape if not destroying the value of the check altogether will simply lower the amount noted and render the variance between the face of the check and such projections immediately apparent.

In Fig. 1 I have shown one form of check, though, as will be readily apparent, other forms may be employed so long as they contain the elements essential to the practice of my method. The body A of the check contains the usual printed matter, though, of course, this and other marks hereinafter referred to may all be written or placed thereon in any manner. Along one side of the check and immediately adjacent to that portion which is to form one edge thereof is printed a series of decimal notations—for instance, in the form illustrated, the words "Hundreds of thousands," "Tens of thousands," "Thousands," "Hundreds," "Tens," and "Units." A stud B (or other strip which may be severed from the body of the check) is formed adjacent to said notations, and opposite each appear abbreviations corresponding to the notations—to wit, "H. T.," "T. T.," "T.," "H.," "T.," and "U." The stub or strip may of course contain any other desired matter. After the check is drawn it is severed from the stub, the line of severance being close up to the decimal notations, as shown in Figs. 2, 3, and 4. As will be seen, however, the line of severance is not straight; but projections are formed opposite the decimal notations which appear on the face of the check. The projections are of an arbitrary or special and fixed form and by their form serve to indicate the number of times the particular decimal notation should be multiplied. In other words, the projection or projections, as the case may be, are multiples of the decimal figure. These projections may and preferably will be formed with a rule having a series of indentations or notches along its edge or edges, or a series of rules, each having an arbitrary notch or series of notches, may be employed. In Fig. 5 a single rule is shown, with the cutting-notches formed along one edge. The first notch *a* is designed to form a projection on the check indicative of "1." The second notch *b* will form a double projection indicative of "2," the third and fourth notches *c* and *d* forming three and four projections indicative of "3" and "4." The fifth notch *e* is given a different shape, conforming in general outline to the Roman numeral "V," so that the single projection it will form will stand for "5" and will be clearly distinguishable from the projection formed by the notch *a*, as that will partake more of the similarity to the numeral "I." At least, it will be much narrower at the base, with one edge standing at approximately right angles to the edge of the check. It will likewise by preference be made slightly more shallow. The sixth notch *f* is formed substantially on the lines of "VI"—that is to say, a wide V-notch and a single narrow notch, with one edge at right angles to the rule. The three remaining notches or series of notches indicate "7," "8," and "9" and correspond in general to the Roman numerals for such notations. The rule may be made in the form shown in Fig. 7, with a series of separate fingers C connected to or extending from a common connecting-bar D, each finger having one or more of the cutting-notches formed therein. Again, a series of separate rules, each formed with one severing-notch, may be connected together, as illustrated in Fig. 8.

In Fig. 6 a rule is shown having a different form of notch from that illustrated in the other figures. They are simply arbitrary symbols which form projections on the end of the check or other evidence of value from "1" to "9." The projections formed by it may be reduced in size, thus at the same time reducing their indicative value; but they cannot be so altered as to raise the amount.

In Fig. 9 a detail of one of the notches is shown, illustrating the inward-tearing edge *g* and sharp cutting edge *h*. This arrangement is found in practice to give a clean severance of the paper, though, of course, any other practicable form may be employed.

In protecting a check—say, for instance, that shown in Fig. 2, which is drawn for seven hundred and fifty thousand six hundred dollars—the rule is so applied along the line of severance as to form opposite the decimal notation "Hundreds of thousands" the projections corresponding to "7," opposite the decimal notation "Tens of thousands" the projection (or projections, as the case may be) corresponding to "5," and opposite the word "Hundreds" the arbitrary projection (or projections) corresponding to "6." No projections will be formed opposite the "Thousands," "Tens," and "Units," and there will be no room for the formation of any. As will be readily seen, any alteration of the projections will simply tend to lower their indicative value.

The checks shown in Figs. 3 and 4 simply illustrate the adaptability of the method. Furthermore, there will be formed on the stub a complemental indication which will show at a glance to the drawer of the check the amount for which it was drawn.

As before noted, the form of check shown is merely illustrative, and any check or evidence of value capable of being protected in the manner above set forth falls within the spirit and scope of my invention.

As will be seen upon reference to Fig. 2, the stub of the check may be formed with a line of perforations, as at *x*, which will permit the ready severance of the check from the major portion of the stub in case it is not desired to protect the check by the method above set forth.

In order to facilitate the ready reading or understanding of the notches of the ruler, it may be provided with numbers opposite each notch, as shown in Figs. 5 to 8, inclusive.

No claim is herein made to the rule or severing device having the notches therein for forming the arbitrary projections. That is reserved for another application.

Having thus described my invention, what I claim is—

1. A check or the like, having a series of decimal or other notations thereon, with a series of projections formed opposite a notation, said projections being of special form or contour indicative, by reason of their form, of a predetermined value.

2. A check or the like, having a series of decimal or other notations thereon, with a series of projections of varying shape or contour formed opposite the corresponding notation for which the check is drawn upon its face, said projections being of special form or contour and indicative, by reason of their form, of a predetermined value.

3. A check or the like, having a series of decimal or other notations thereon, with a projection free from surface marks formed opposite a notation, the form or contour of said projection alone signifying a numerical value corresponding to the face of the check.

4. A check or the like, having a series of decimal or other notations thereon, with a projection free from indicating-marks upon its face formed opposite one of said notations, the notation opposite which the projection is formed and the shape of the projection together signifying the amount for which the check is drawn.

In testimony whereof I have signed my name to this specification in the presence of two subscribing witnesses.

STANLEY W. FINCH.

Witnesses:
HORACE A. DODGE,
C. C. BURDINE.